(12) United States Patent
Asaya (10) Patent No.: US 6,421,076 B1
(45) Date of Patent: Jul. 16, 2002

(54) IMAGE FORMING APPARATUS

(75) Inventor: Yasumasa Asaya, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/455,451

(22) Filed: Dec. 6, 1999

(30) Foreign Application Priority Data

Dec. 17, 1998 (JP) .......................................... 10-359175

(51) Int. Cl.[7] .............................. B41J 2/47; B41J 2/435
(52) U.S. Cl. ...................................... 347/234; 347/248
(58) Field of Search .............................. 347/116, 229, 347/234, 235, 250; 358/448, 449, 450

(56) References Cited

U.S. PATENT DOCUMENTS

| | | | | |
|---|---|---|---|---|
| 4,912,565 A | * | 3/1990 | Yokota et al. | 358/447 |
| 5,099,260 A | * | 3/1992 | Sato et al. | 347/116 |

FOREIGN PATENT DOCUMENTS

| JP | A-64-38764 | 2/1989 | | |
|---|---|---|---|---|
| JP | 7-239598 | * 9/1995 | ............ | B41J/2/525 |

* cited by examiner

Primary Examiner—Hai Pham
(74) Attorney, Agent, or Firm—Oliff & Berridge, PLC (57) ABSTRACT

The positional deviation of each image along the vertical scanning direction is reduced when plural images are overlapped without introduction of significantly complex structure and control. One light beam out of 4 light beams is assigned as the reference light beam. The delay time of respective modulation start timings of other three light beams with respect to the modulation start timing of a reference light beam is divided by the scanning period of the light beam to calculate a quotient Q and a remainder R, and the fraction rounding process is applied to the remainder correspondingly to the number of light beams having the remainder R value exceeding ½ so that rounding up of the remainder R or rounding down of the remainder R is selected to determine the modulation starting timing of each light beam based on the selection condition for selecting a fraction rounding process out of the rounding down of the remainder R (represented by "Qc, m, and y") and the rounding up of the remainder R (represented by "Qc, m, y+1").

6 Claims, 9 Drawing Sheets

FIG.7A
COUNTING FRACTIONS ONE

FIG.7B
COUNTING FRACTION OF 5 AND OVER AS A UNIT AND DISREGARD THE REST

● AREA WHERE THERE IS SELECTED BEAM
○ AREA WHERE THERE IS NOT-SELECTED BEAM

FIG.8

FIG.9

IMAGE FORMING APPARATUS

BACKGROUND OF THE INVENTION

1. Field of the Invention

This invention relates to an image forming apparatus, and more particularly relates to an image forming apparatus in which a photoreceptor is scanned with plural light beams to form plural images on it and the plural images are overlapped to form and generate a single image.

2. Description of the Related Art

Apparatus for forming an electrostatic latent image by scanning with a light beam modulated correspondingly to an image to be formed and forming an image on a photoreceptor have been used for apparatus such as printers and copying machines heretofore, and concomitantly with commercialization of digital or color apparatus the image forming apparatus having the above-mentioned structure have been used widely. A color image is realized by forming images of different colors on a photoreceptor successively so that, for example, images of four colors (for example, C, M, Y, and K) different in color each other are overlapped on the single photoreceptor, however this method is disadvantageous in that it takes a time for forming a final color image.

To solve the problem, a so-called tandem type image forming apparatus in which the image forming apparatus has plural photoreceptors, the photoreceptors are scanned and exposed simultaneously with plural light beams respectively to form images different in color each other on the respective photoreceptors, and the color images of different colors are overlapped on a single intermediate transfer medium to form a color image is proposed. Because a tandem type image forming apparatus forms images of respective colors simultaneously, the time required for forming a color image is significantly shortened.

In a tandem type image forming apparatus, it is required to successively delay the writing start timing (modulation start timing) of light beams corresponding to respective colors synchronously with the motion of the intermediate transfer medium to overlap images (toner image) of respective colors formed on the respective photoreceptors without deviation along the vertical scanning direction (the direction perpendicular to the scanning direction of the light beam) on the intermediate transfer medium. The delay magnitude is determined based on the error of the incident position of the light beam on the photoreceptor, the error of a half circumference length of the photoreceptor, and the error of moving speed of the intermediate transfer medium between photoreceptors of respective colors.

However, the image positional deviation magnitude allowable for overlapping of images is generally at most 0.1 mm though it depends on the image data to be generated; on the other hand, the values of the above-mentioned parameters vary when the parts are deformed due to heat or external force. Even though the mechanical accuracy such as dimensional accuracy of the parts are merely improved, it is difficult to maintain the image overlapping accuracy continuously. If the magnitude of the image positional deviation is significantly larger, for example, the hue of a color varies in an area where the hue is to be uniform or the hue becomes partially different in the area to cause non-uniformity, and the non-uniform hue is regarded as the image quality detect.

To solve the above-mentioned problem, a method for correcting the positional deviation of an image in which the position of images of respective colors transferred onto an intermediate transfer medium is measured and the writing delay time is corrected correspondingly to the detected positional deviation magnitude has been employed heretofore.

In the case plural images are overlapped to form and generate a single image, the positional deviation of images to be overlapped occurs in the horizontal scanning direction (the scanning direction of a light beam), it is possible for the horizontal direction to correct the image position in a length unit smaller than the pixel interval along the horizontal scanning direction, and as the result, the positional deviation of the image can be corrected precisely.

The image position along the horizontal scanning direction of the image varies depending on the modulation start timing of a light beam in one scanning with the light beam, because usually the interval from the time when a beam position detection sensor such as SOS sensor detects the light beam to the time when modulation of the light beam is started is controlled by use of the data represented by the number of pulses of a clock signal, by employing the method in which the clock signal having the frequency higher than the frequency corresponding to a pixel interval is used and the data is corrected correspondingly to the positional deviation magnitude in the horizontal scanning direction, the image position is corrected in a length unit smaller than the pixel interval along the horizontal scanning direction.

However, because a pixel interval along the vertical scanning direction (scanning line interval) is the minimum unit for correction of the image position usually for the image positional deviation along the vertical scanning direction, a method in which the delay time of modulation start timing for correcting the image positional deviation along the vertical scanning direction is divided by the time equivalent to one scanning with a light beam to figure out the number of delay scanning lines and, if a fraction is generated, the fraction is subjected to rounding process to generate an integer, and the delay time of the modulation start timing is converted to an integral multiple of the time equivalent to one scanning with the light beam has been employed. Various rounding methods such as rounding up the fraction, rounding down the fraction, and counting fractions of 5 and over as a unit and disregarding the rest are available as described in, for example, Japanese Published Unexamined Patent Application No. Sho 64-38764 as the fraction rounding process of the number of delay scanning lines.

For example, in the case of rounding method of counting fractions of 5 and over as a unit and disregarding the rest, a fraction of the number of delay scanning lines exceeding ½ is rounded up and a fraction smaller than ½ is rounded down, as the result the writing positional deviation (=(the actual value of the number of delay scanning lines before rounding by means of counting fractions of 5 and over as a unit and disregarding the rest–the integral value of the number of delay scanning lines after rounding by means of counting fractions of 5 and over as a unit and disregarding the rest)×scanning line interval) is suppressed to a value equal to or smaller than ½ of the scanning line interval. However, in the case that the number of light beams to be written is 3 or larger, because the numbers of delay scanning lines of respective light beams are not correlative each other (at least the fraction values of numbers of delay scanning lines of respective light beams are not correlative each other), the position of respective images formed by light beams deviates at most ±(scanning line interval/2) along the vertical scanning direction.

The maximum positional deviation magnitude of the image is the same as the above-mentioned result for the case in which rounding by means of rounding up the fraction or rounding down the fraction is employed instead of the above-mentioned rounding by means of counting fractions of 5 and over as a unit and disregarding the rest, and the maximum positional deviation magnitude along the vertical scanning direction is approximately equal to the value of a scanning line interval regardless of any fraction rounding method selected from among known various fraction rounding methods. Therefore, the correction accuracy of the image positional deviation along the vertical scanning direction is insufficient.

It is possible to correct the image position along the vertical scanning direction in a length unit smaller than a scanning interval by use of a structure having plural respective deflection units corresponding to plural light beams to be deflected by separate respective deflection units, in which the phase of the light beam deflection scanning by means of each deflection unit is varied (for example, by varying the rotational phase of the rotating polygonal mirror, if a rotating polygonal mirror is used as the deflection unit), however the structure and the control are very complex disadvantageously.

On the other hand, the structure for deflecting plural light beams by means of single deflection unit requires a deflection unit (for example, a mechanism for tilting a mirror very small angle) that deflects the beams in the vertical scanning direction, and also the requirement bring about disadvantageous very complex structure and the control.

SUMMARY OF THE INVENTION

The present invention was accomplished to solve the above-mentioned problem and provides an image forming apparatus which is capable of reducing the positional deviation of images in the direction intersecting with the scanning direction of the light beam without significantly complex structure and control when plural images are overlapped.

Figure 1:
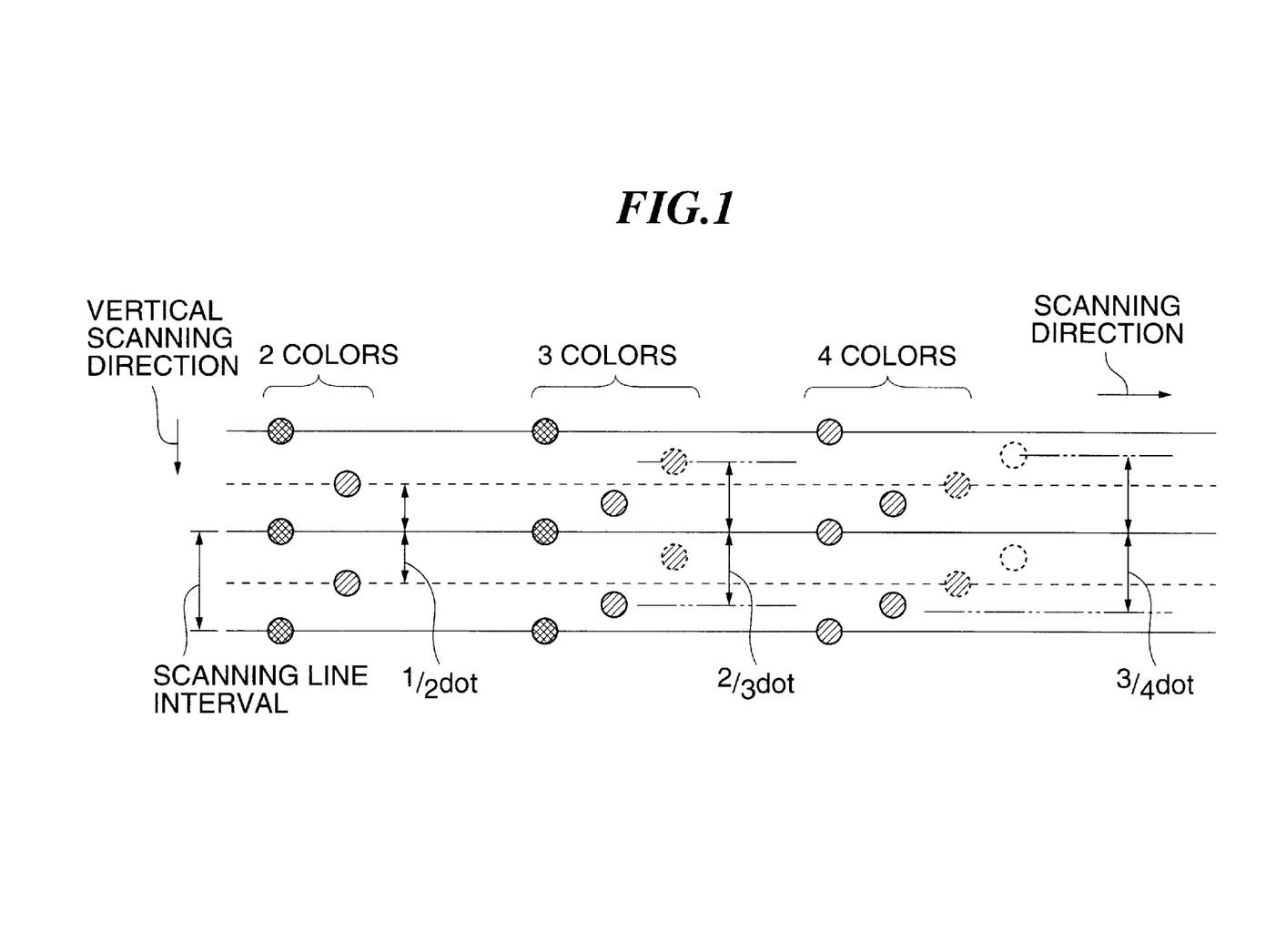
FIG. 1 is a conceptual diagram for illustrating the state in which the position along the vertical scanning direction of N light beams is dispersed most significantly.

In the case that deflected N (N≧2) light beams are emitted on an object to be scanned at the same timing and period, the maximum deviation (the state at the time when the positional deviation magnitude in the vertical scanning direction is maximized) of the position of the N light beams along the vertical scanning direction under the condition that the irradiation position along the vertical scanning direction which is orthogonal with the scanning direction of light beams is variable in a scanning line interval unit occurs at the timing when the respective positions of N light beams (each light beam is shown with "○") are arranged uniformly with a space of the interval of (scanning line interval/N) in a range equivalent to the scanning line interval as shown in FIG. 1.

FIG. 1 is a diagram for illustrating conceptually the positional relation between light beams, and if the position of a light beam is regarded as the position of an image, then the position of light beams shown in FIG. 1 corresponds to the state at the time when the positional deviation of plural images overlapped to form a single image is maximized.

The inventors of the present invention found that the maximum positional deviation magnitude of the position of N light beams was (N−1)/N times a scanning line interval (represented by "dot" in FIG. 1), that is, the maximum positional deviation magnitude was smaller than a scanning line interval, and based on this fact, the inventors of the present invention reached to the idea that it was possible to reduce the maximum positional deviation magnitude of images along the direction intersecting with the scanning direction of light beams to the value smaller than a scanning line interval in spite of the restriction that the variation unit of the modulation start timing of light beams was the time equivalent to one scanning with a light beam, and thus the present invention was accomplished.

The image forming apparatus according to the present invention, in which a photoreceptor is scanned with plural light beams respectively to form plural images thereon and the plural images are overlapped to generate a single image, has a detection part that detects a positional deviation magnitude of each of plural images in a direction orthogonal to a scanning direction with the light beams, a correction part that calculates a deviation of a modulation start timing of each light beam for correcting the positional deviation magnitude detected by the detection part, and determines the modulation start timing of each light beam based on the combination of the deviation of the modulation start timing of each light beam using the time required for one scanning with the light beam as a unit for changing the modulation start timing of each light beam, and a modulation control part that controls the modulation of each light beam according to the modulation start timing determined by the correction part.

The image forming apparatus functions to scan a photoreceptor with plural light beams to form plural images, and to overlap the images to generate a single image. As the result, for example, if the plural images are images different in color, the output image which has been generated by synthesizing the plural images is a multi-color image (a full color image if respective colors of the plural images are K, Y, M, and C).

In the known image forming apparatus, because the fraction rounding process of the number of delay scanning lines of individual light beams is performed with reference only to the value of the number of delay scanning lines to be processed, the maximum deviation magnitude of the image along the direction intersecting with the scanning direction is approximately equal to the value of a scanning line interval. On the other hand, in the image forming apparatus of the present invention, because the modulation start timing of each beam is determined based on the combination of the deviation of the modulation start timing of each light beam, for example, the position of light beams is arranged not uniformly as shown in FIG. 1 and the modulation start timing is determined so that the position of the light beams is distributed biasedly in the range equivalent to a scanning line interval (in detail, the fraction of the deviation of the modulation start timing is rounded) to thereby reduce the maximum positional deviation magnitude of each image along the direction intersecting with the scanning direction of the light beam ((N−1)/N times a scanning line interval wherein N is the number of light beams).

Therefore, the positional deviation of each image along the direction intersecting with the scanning direction of the light beam is reduced when plural images are overlapped. Furthermore, though the present invention may be applied not only to an embodiment in which plural light beams are deflected by a single deflection unit but also to an embodiment in which plural light beams are deflected by any of plural deflection units, particularly the former embodiment in which a single deflection unit is provided is preferable because the positional deviation of each image along the direction intersecting with the scanning direction of the light beam is reduced without introduction of significantly complex deflection mechanism and control for the vertical scanning direction of each light beam.

In the image forming apparatus, the correction part may obtain a quotient Q and a remainder R for each of the light beams other than a reference light beam by dividing the deviation of the modulation start timing of each of the light beams from the modulation start timing of a reference light beam by a time required for one scanning with the light beam, and may determine the modulation start timing of each of the light beams based on a combination of values of the remainder R for respective light beams.

Because the remainder R represents the positional deviation magnitude along the direction intersecting with the scanning direction of the image formed by delaying the modulation start timing of other light beams by a predetermined number of scanning line scanning with respect to the position along the vertical scanning direction of the image formed by the reference light beam, the positional relation of each light beam is judged based on the combination of the remainder R value of each light beam, and the modulation start timing can be determined so that the position of each light beam is distributed biasedly in the range equivalent to a scanning line interval.

Further, in the image forming apparatus, the correction part may obtain a quotient Q and a remainder R for each of N (N≦4) light beams by dividing the deviation of the modulation start timing of each of (N−1) light beams from the modulation start timing of a reference light beam by a time required for one scanning with the light beam, and based on conditions prescribed according to respective possible values of the number of the light beams having the remainder R exceeding (N−2) IN, may select rounding up or rounding down of the remainder R for each of the light beams to determine the modulation start timing of each of the light beams.

In detail, the correction part calculates a quotient and a remainder R by dividing the deviation of the modulation start timing of respective N−1 light beams with respect to the modulation start timing of the reference light beam out of N (N≦4) light beams by the time equivalent to one scanning with the light beam, and selects a fraction rounding process out of rounding up the remainder R and rounding down the remainder R for each light beam based on the selection condition for selecting a fraction rounding process determined correspondingly to the respective values which can be as the number of light beams having the remainder R exceeding (N−2)/N (if N=3, the value which can be as the number of light beams having the remainder R value exceeding ⅓ is "0, 1, and 2"; on the other hand, if N=4, the value which can be as the number of light beams having the remainder R value exceeding ½ is "0, 1, 2, and 3"), and then determines the modulation start timing of each light beam.

In the case that the number of light beams having the remainder R value exceeding (N−2)/N is a relatively high or relative low value, because the position of each light beam is distributed biasedly in the range equivalent to a scanning line interval, the selection condition can be determined so that the fraction rounding process may be selected fixedly from among the rounding down of the remainder R and the rounding up of the remainder R for each light beam. On the other hand, in the case that the number of light beams having the remainder R value exceeds (N−2)/N is a medium value, because it is likely that the degree of biased distribution of the position of each light beam in the range equivalent to a scanning line interval is low, the selection condition can be determined so that, for example, the fraction rounding process may be selected variably from among the rounding down of the remainder R and the rounding up of the remainder R depending on the remainder R value for respective light beams.

Because the correction part determines the modulation start timing of each light beam by selecting the fraction rounding process from among the rounding down of the remainder R and the rounding up of the remainder R for each light beam based on the above-mentioned selection condition, the modulation start timing of each light beam is determined in a short time.

In the image forming apparatus, the correction part may apply the determination process of the modulation start timing of each light beam based on the combination of the deviation of the modulation start timing of the light beam only to some light beams the number of which is smaller than the total number of light beams.

Therefore, the above-mentioned invention is applied when, for example, a color image is generated, the present invention is applied only to the image of a color which causes remarkable color deviation out of images of component different colors for forming a color image to determine the modulation start timing of the light beam, and the image quality of the generated image is improved the more.

In the image forming apparatus, the detection part may be capable of detecting the positional deviation magnitude of the image with a detection unit of 1/N scanning line interval (N represents the number of light beams to which the correction part applies the modulation start timing determination process).

BRIEF DESCRIPTION OF THE DRAWINGS

A preferred embodiment of an image forming apparatus according to the present invention will be described in detail based on the drawings.

DETAILED DESCRIPTION OF THE PREFERRED EMBODIMENTS

Figure 2:
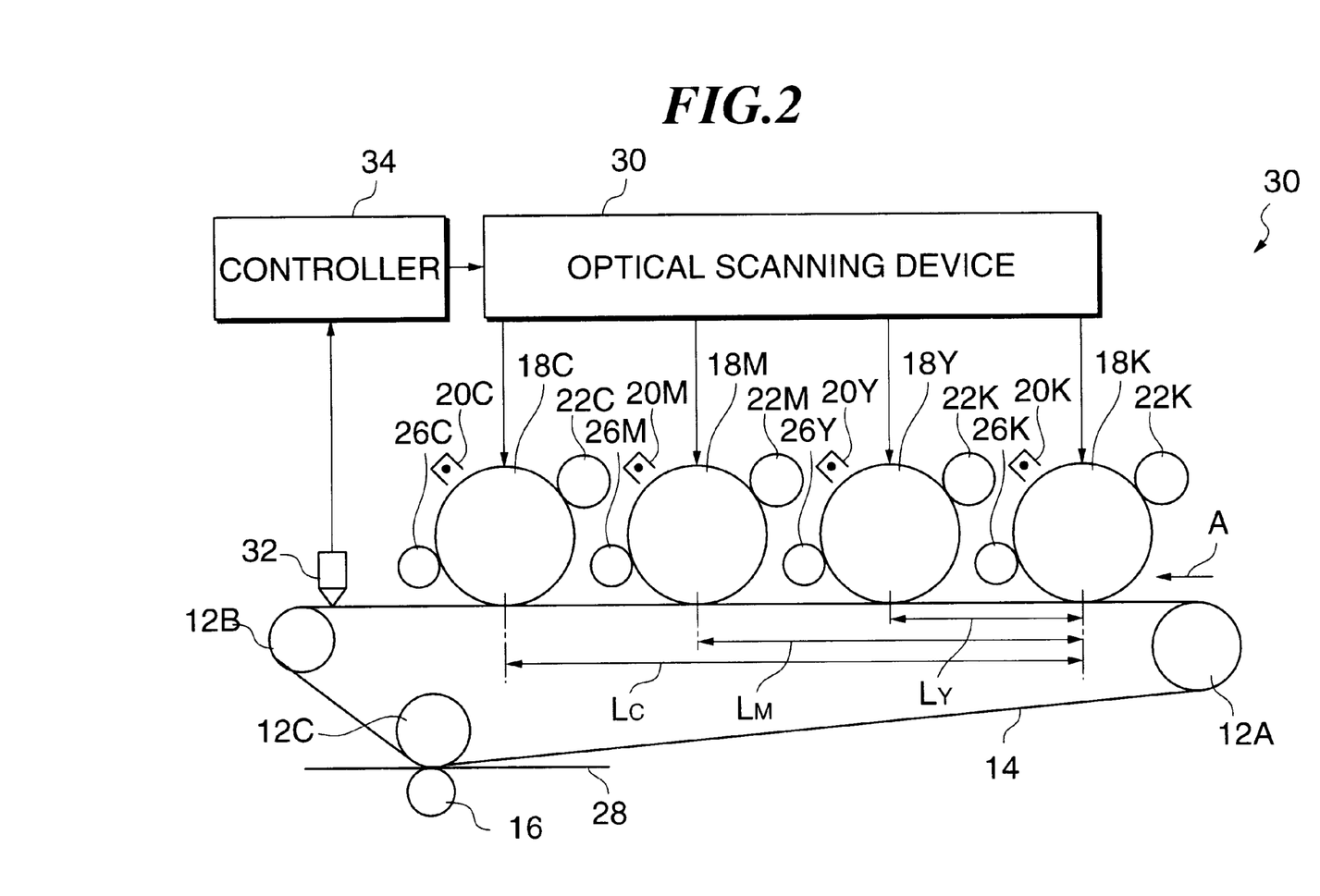
FIG. 2 is a schematic structure of a color image forming apparatus in accordance with an embodiment.

One example of an embodiment of the present invention will be described in detail hereinafter with reference to the drawings. FIG. 2 shows a diagram for illustrating a color image forming apparatus 10 as the image forming apparatus in accordance with the present invention. The color image forming apparatus 10 is provided with three conveyer rollers 12A to 12C, an intermediate transfer medium 14 comprising an endless belt spanned over the conveyer rollers 12A to 12C, and a transfer roller 16 disposed facing to the conveyer roller 12C with interposition of the intermediate transfer medium 14.

A photoreceptor drum 18K for forming a black (K) image, a photoreceptor drum 18Y for forming an yellow (Y) image, a photoreceptor drum 18M for forming a magenta (M) image, and a photoreceptor drum 18C for forming a cyan (C) image are provided with an approximately equal interval above the intermediate transfer medium 14 along the moving direction (in the direction of arrow A in FIG. 2) of the intermediate transfer medium 14 which is moved when the intermediate transfer medium is rotationally driven. Respective axis lines of the photoreceptor drums 18 are disposed orthogonally to the moving direction of the intermediate transfer medium 14.

For discrimination of respective components for colors, symbols K/Y/M/C are added to respective characters of the components which are provided for colors K, Y, M and C respectively hereinafter as described herein above.

Electric chargers 20 for charging photoreceptor drums 18 are provided on the periphery of the photoreceptor drums 18, and an optical scanning unit 30 for irradiating laser beams onto respective charged photoreceptor drums 18 to form electrostatic latent images on the photoreceptor drums 18 is provided above the photoreceptor drums 18. The optical scanning unit 30 is provided with plural laser diodes (LD) 44 the number of which is same as the number of the photoreceptor drums (refer to FIG. 3), respective laser beams emitted from LD 44 are incident onto a single rotating polygonal mirror (not shown in the drawing) served as a deflection unit and deflected for scanning at the same timing.

On the periphery of each photoreceptor drum 18, a developing unit 22 for developing an electrostatic latent image formed on a photoreceptor drum 18 with toner of a predetermined color (K, Y, M, or C) to form a toner image, a transferring unit (not shown in the drawing) for transferring the toner image formed on the photoreceptor drum 18 onto the intermediate transfer medium 14, and a cleaner 26 for removing residual toner on the photoreceptor drum 18 are provided along the rotation direction of the photoreceptor drum 18 on the downstream of the laser beam irradiation position.

Respective toner images of different colors formed on photoreceptor drums 18 are transferred on the belt surface of the intermediate transfer medium 14 so as to be overlapped each other. As the result, a color toner image is formed on the intermediate transfer medium 14, and the formed color toner image is transferred on a transfer material 28 fed between the conveyer roller 12C and the transfer roller 16. The transfer material is fed into a fixing unit not shown in the drawing and the transferred toner image is fixed. A color image (full color image) is formed on the transfer material.

Figure 3:
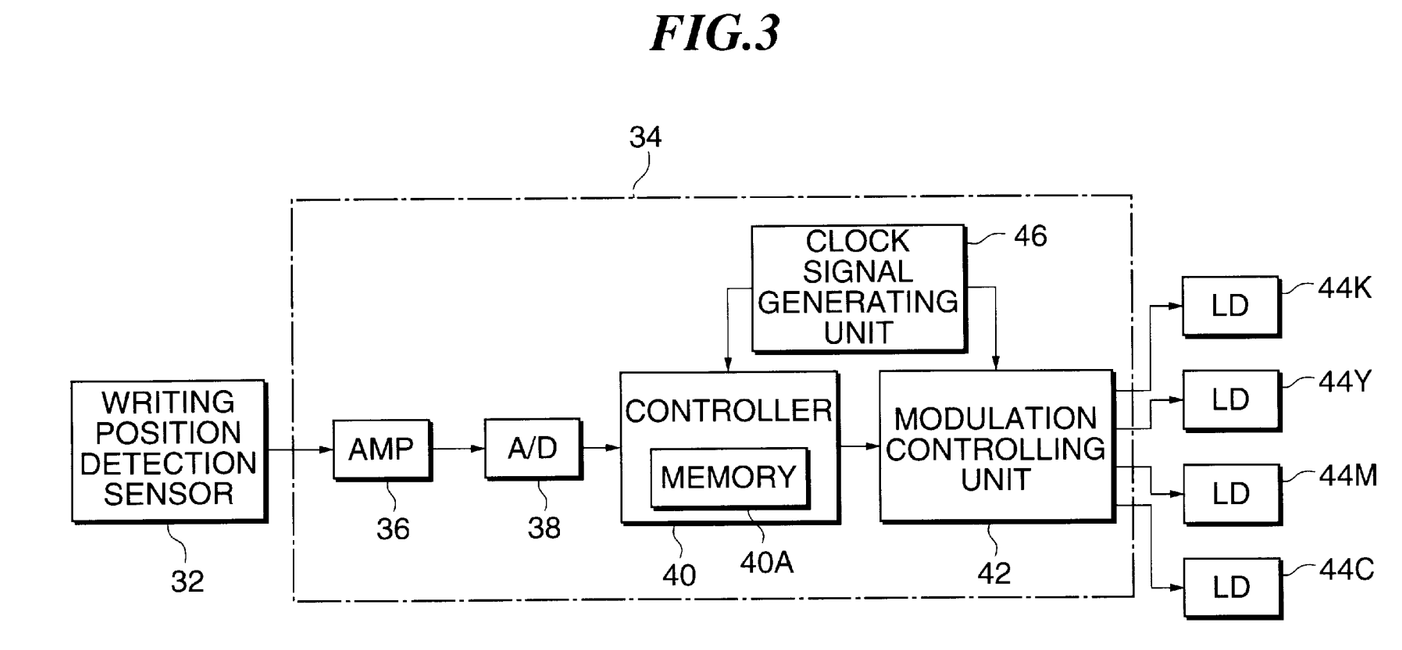
FIG. 3 is a block diagram for illustrating the schematic structure of a control unit and peripheral components.

A writing position detection sensor 32 is disposed at the position on the downstream in the moving direction of the intermediate transfer medium 14 from the photoreceptor drums 18K to 18C. The writing position detection sensor 32 comprises a pair of a light emitting diode such as LED and a light receiving element such as PIN photosensor. The writing position detection sensor 32 is connected to a control unit 34, and connected to a controller 40 for controlling the operation of components of the image forming apparatus 10 through the amplifier 36 and A/D (analog digital) converter 38 as shown in FIG. 3. The writing position detection sensor 32 corresponds to the detection part in accordance with the present invention together with the amplifier 36 and the A/D converter 38.

The controller comprises a micro-computer or the like and has a built-in memory unit 40A for storing various data. The memory unit 40A stores the image data of a test chart image (described in detail hereinafter) for measuring the positional deviation magnitude of an image. A modulation controlling unit 42 is connected to the controller 40, and four laser diodes (LD) 44K, 44Y, 44M, and 44C of the optical scanning unit 30 are connected to the modulation controlling unit 42. The controller 40 determines respective modulation timings of the laser beams emitted from LD 44 and sets the timing control data which represents the determined modulation timing to the modulation controlling unit 42. The controller 40 corresponds to the correction part of the present invention.

A clock signal generating unit 46 is connected to the modulation controlling unit 42, and the clock signal generating unit 46 generates a clock signal for determines the modulation timing every one dot in one scanning with a laser beam. A beam position detection sensor (not shown) for detecting the passage of a specified laser beam (for example, the laser beam K emitted from the LD 44K) at the scanning start side end position (SOS position) in the scanning range is provided in the internal of the optical scanning unit 30.

A beam position detection signal is supplied from the beam position detection sensor to the modulation controlling unit 42, the clock signal is supplied from the clock signal generating unit 46 to the modulation controlling unit 42, and the image data which represents the image to be formed is supplied to the modulation controlling unit 42. The modulation controlling unit 42 controls the driving of the LD 44 based on the timing of the respective input signals so that respective modulated laser beams are emitted from the LD 44 at the timing corresponding to the timing control data supplied from the controller 40. The modulation controlling unit 42 corresponds to the modulation control part of the present invention.

Figure 5:
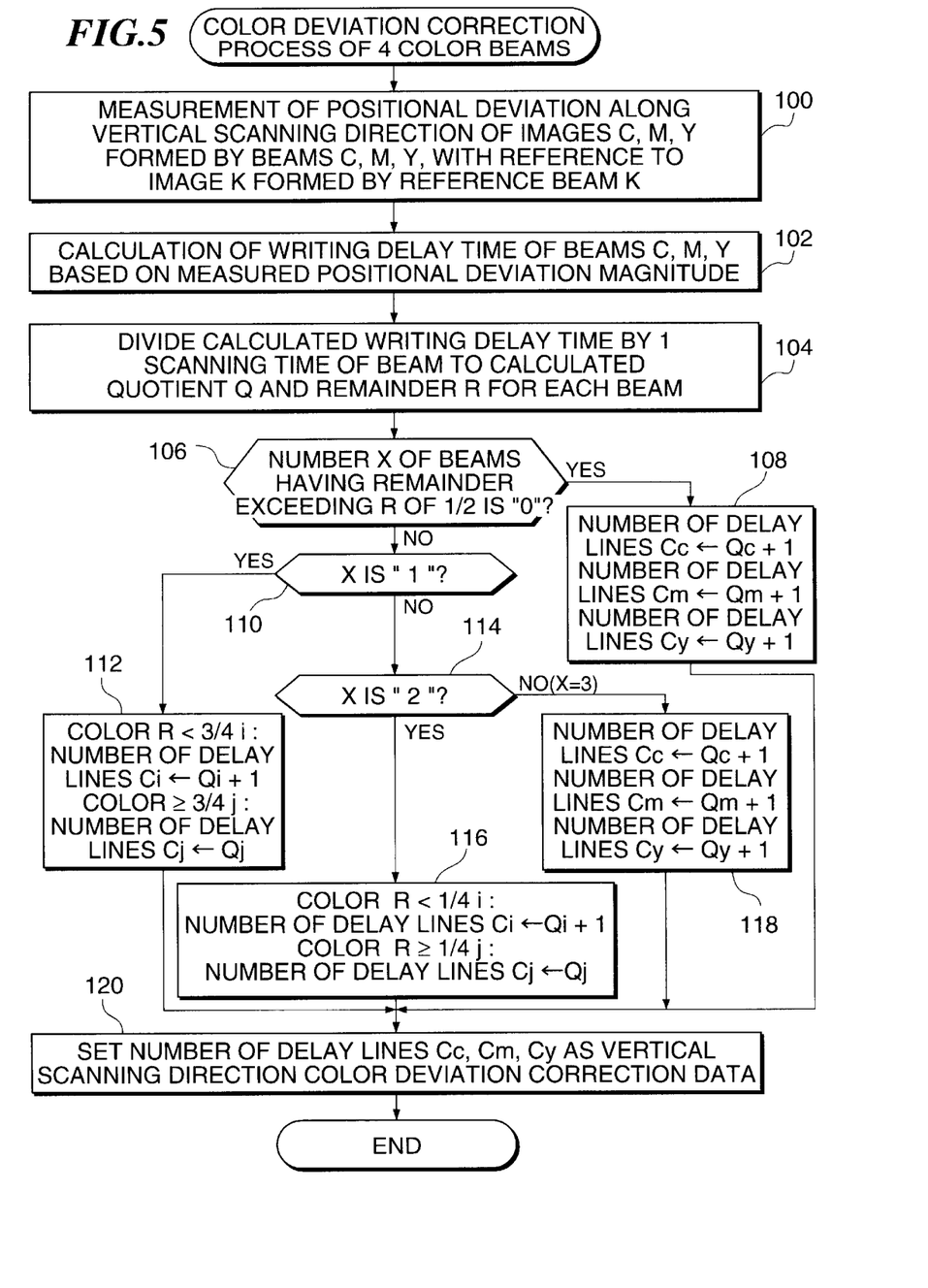
FIG. 5 is a flow chart for describing the color correction process applied to four beams.

Next, color deviation correction process of four beams performed by the controller 40 as the operation of the embodiment is described with reference to a flow chart shown in FIG. 5. The color deviation correction process is performed not only when the image forming apparatus 10 is installed but also after the image forming apparatus 10 is installed periodically.

In step 100, a positional deviation magnitude of the images C, M, and Y formed by the laser beams C, M, and Y along the moving direction of the intermediate transfer medium 14 (vertical scanning direction) with respect to the image K formed by the reference laser beam K is measured.

Figure 4:
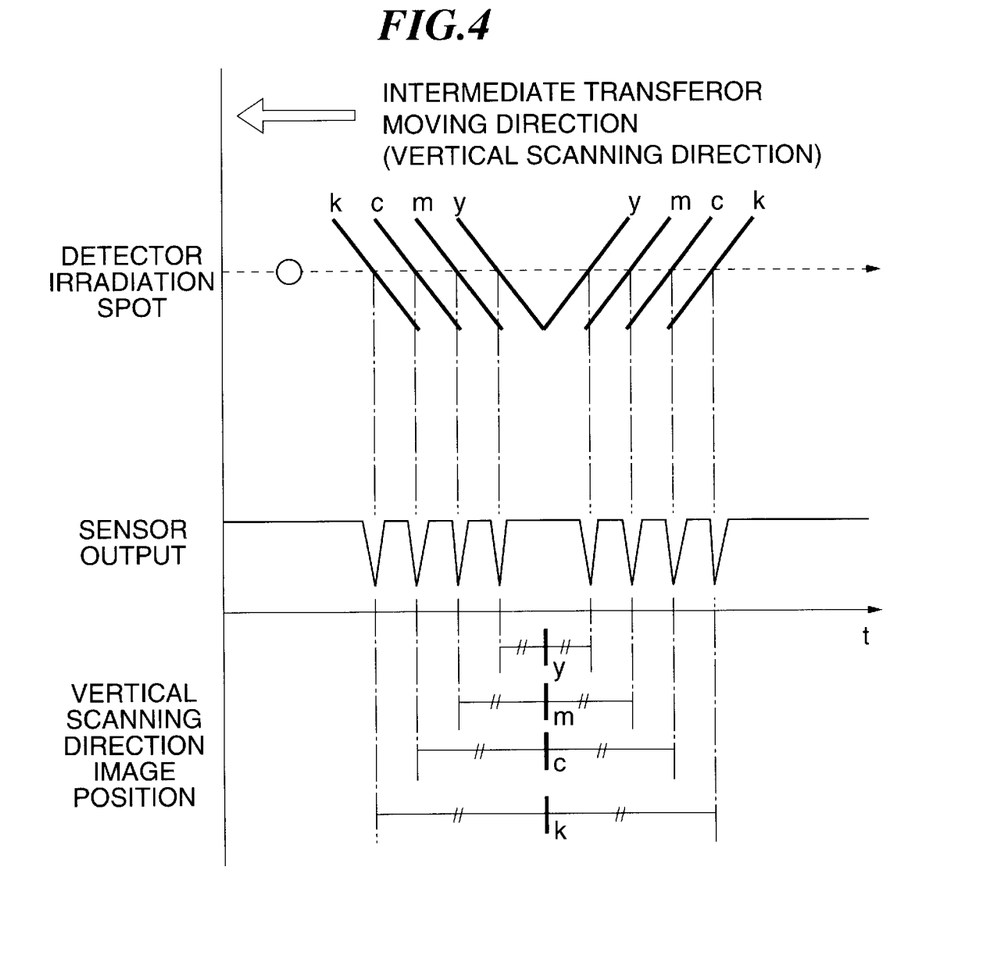
FIG. 4 is a schematic diagram for showing an example of a test chart image and the waveform of an output signal from a writing position detection sensor.

In this embodiment, for example, an image formed by overlapping line images comprising respective pairs of slant lines for the colors K, Y, M, and C, one scanning line of a pair is inclined to the scanning direction (horizontal scanning direction) of the laser beam and the other slant line of the pair is inclined to the moving direction of the intermediate transfer medium (vertical scanning direction) orthogonal to the horizontal scanning direction, which lines of the pair are disposed line-symmetrically with respect to the predetermined axis parallel to the horizontal scanning direction, is used as the test chart image for measuring the positional deviation magnitude of an image as shown in FIG. 4, and an image data which represents the test chart image is stored in the memory unit 40A.

When the positional deviation magnitude of an image is to be measured, the controller 40 takes in the image data of the test chart from the memory unit 40A, and sends out the timing control data for specifying the image data of the test chart image and the modulation timing of laser beams to the modulation controlling unit 42.

In this embodiment, as the timing control data for specifying the modulation timing that is relative to the position along the vertical scanning direction of images of respective colors, the data (number of delay lines Cc, Cm, and Cy) which are formed by representing the delay time of the modulation start timing of the other laser beams with reference to the modulation start timing of the laser beam K in the form of the number of lines for each color are used. When the image forming apparatus 10 is installed, the default value is set as the number of delay lines.

Upon receiving the image data and timing control data, the modulation controlling unit 42 drives LD 44 so that the laser beams are modulated correspondingly to the respective image data of the test chart image at the predetermined timing corresponding to the timing control data.

Respective four laser beams emitted from LD 44 are deflected by a single rotating polygonal mirror, reflected toward corresponding photoreceptor drums 18 by way of optical parts such as fθ lens (not shown in the drawing) for scanning the peripheral surface of the photoreceptor drums 18 which have been charged by respective electric chargers 20. Electrostatic latent images of the test chart image of respective colors formed on the peripheral surface of the photoreceptor drums 18 by laser beam scanning are developed as toner images different in color each other by developing units 22, the toner images of different colors are overlapped on the belt surface of the intermediate transfer medium 14. As the result, the test chart image is formed on the belt surface of the intermediate transfer medium 14.

When the portion of the test chart image on the belt surface of the intermediate transfer medium 14 reaches to the position where the writing position detection sensor 32 is disposed, the light which is emitted from the light emission diode of the writing position detection sensor 32 and converged to a small light spot crosses on the test chart image (for example, the position indicated by a broken line in FIG. 4), the light reflected by the belt surface is incident onto the light receiving element, and a signal having a waveform shown as "sensor output" in FIG. 4 is generated from the writing position detection sensor 32.

With reference to the output timing of a pair of pulses in the signal waveform generated correspondingly to a pair of slant lines formed of a predetermined color, the timing equivalent to the intermediate represents the position of the image of the predetermined color along the vertical scanning direction. The signal generated from the writing position detection sensor 32 is supplied to the controller 40 through the amplifier 36 and A/D converter 38.

The A/D converter 38 samples the signal supplied from the writing position detection sensor 32 through the amplifier 36 with a period of 1/S of the laser beam scanning period $t_o$ (wherein, S=2×N: the number of beams N=4 in this embodiment, a period of $t_o/8$) to convert it to a digital data, and sends it out to the controller 40.

The controller 40 determines the timing (image detection timing) equivalent to the intermediate of the output timing of the above-mentioned pair of pulses for each color based on the data supplied from the A/D converter 38, and calculates the difference of the image detection timing of other colors (C, M, and Y) with reference to the image detection timing of K to determine the positional deviation magnitude (equivalent to the time difference) respectively. In step 100, the time difference equivalent to the above-mentioned positional deviation magnitude is calculated as the count value of the pulse of the count clock signal with a period of $t_o/S$.

In the next step 102, the writing delay time of the laser beams C, M, and Y served to correct the above-mentioned positional deviation magnitude is calculated with reference to the writing time (modulation start timing) of the laser beam K based on the respective positional deviation magnitudes (equivalent to the time difference) determined for colors C, M, and Y. The writing delay time is determined by adding the delay time (the value which is derived by converting the delay time to the count value of the pulse of the count clock signal with a period of $t_o/S$), which is represented by the number of delay lines set when the test chart image is recorded, to the positional deviation magnitude (the count value for representing the positional deviation magnitude) calculated in step 100 for colors C, M, and Y respectively. As the result, the respective writing delay times Tc, Tm, and Ty are obtained for colors C, M, and Y.

In the next step 104, the quotient Q and remainder R equivalent to the calculation result obtained when the writing delay time of each color is divided by the scanning period of a laser beam are calculated for each color. Because the writing delay times Tc, Tm, and Ty calculated in step 102 are the value which is obtained by converting the writing delay time to the count value of the pulse of the count clock signal with a period of $t_o/S$, the above-mentioned calculation is accomplished by dividing the writing delay time Ti (i represents any one of C, M, and Y) by the constant S (refer to the equation described herein under)

$Ti/S=Qi+Ri$

Because the writing delay time Ti is determined from the data which is sampled with a period 1/S times the scanning period $t_o$ (period of $t_o/2N$) and A/D converted, the remainder Ri is 1/N of the scanning line interval with inclusion of quantization error, and herein N=4 then the accuracy is ¼ of the scanning line interval. It is assumed that the positional deviation magnitude of the image i with respect to the image K is denoted by Li and the moving speed of the intermediate transfer medium 14 is denoted by V, then the writing delay time Ti is represented by (Ti=Li/V).

In the next step 106, whether the number X of beams having the remainder R exceeding "½" is 0 or not, in other words, whether all the remainders Rc, Rm, and Ry are "½" or smaller or not, is checked. The content of the remainder rounding process for the case of the number of beams N=4 is described in FIG. 6 in two figures, one is a corresponding table for showing categorized separate cases corresponding to the number of beams having the remainder R exceeding ½ (=N-2/N), and the other one is a layout diagram for showing an example of the positional relation of each beam for each case. In this layout diagram, the horizontal direction corresponds to the horizontal scanning direction, and the numeral on the layout diagram represents the scanning period. The circular mark represents the beam position, and the blackened mark out of the circular mark "●" represents the beam position selected by determining the number of delay lines in this process.

Figure 6:
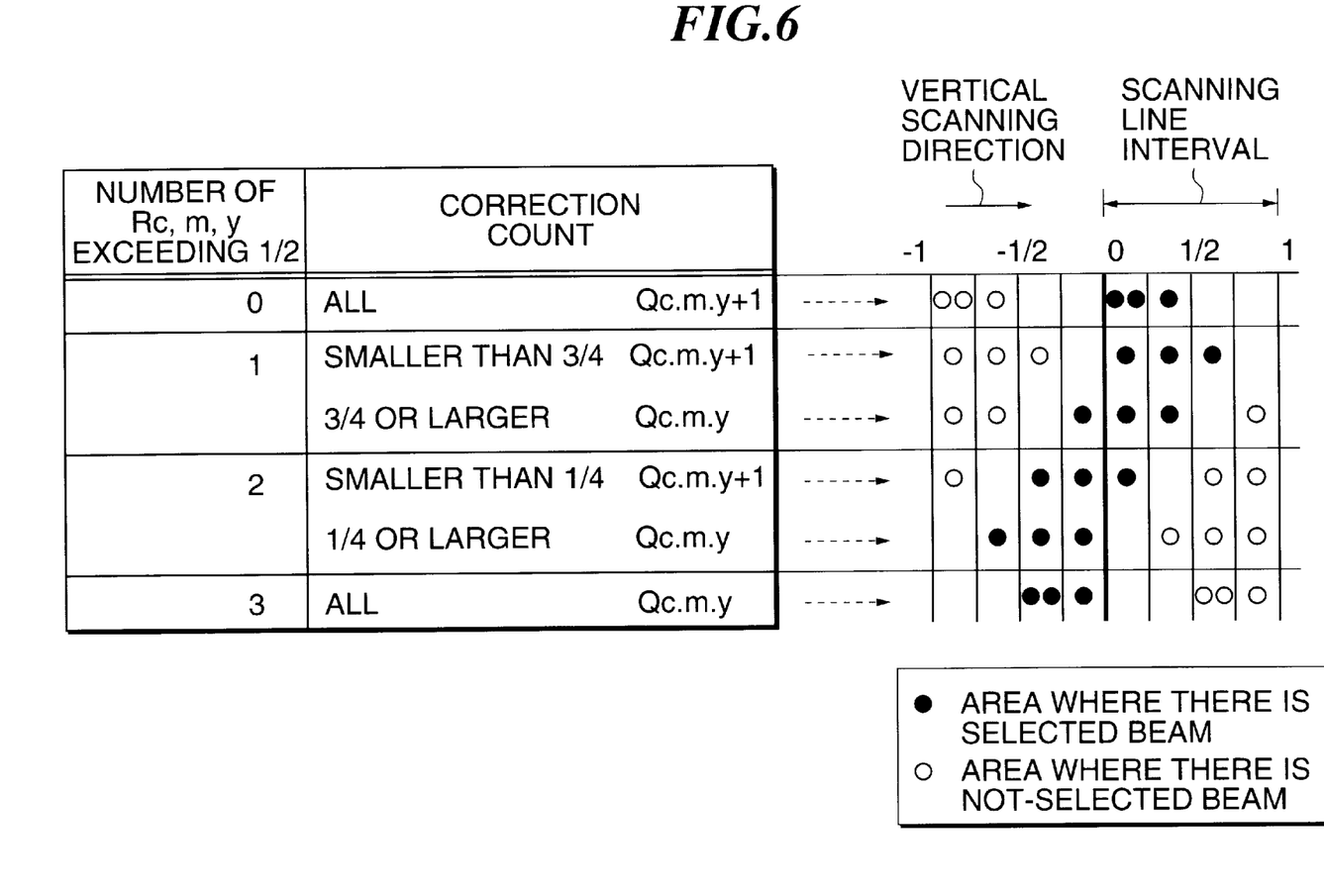
FIG. 6 is a corresponding table for showing categorization of the content of fraction rounding process for the case of the number of beams N=4 corresponding to the number of beams having the remainder R exceeding ½ and a layout diagram for showing an example of the positional relation of each beam for each categorization.

If the check result in step 106 is YES, then this case corresponds to the first field from the top of the corresponding table in FIG. 6 (field that "the number of beams having Rc, m, and y exceeding ½" is "0"), and as obvious from the positional relation (arrangement shown at the first field from the top of the layout diagram) of each beam corresponding to the above-mentioned case shown in the layout diagram in FIG. 6, the beams are positioned in a range equivalent to ½ of the scanning line interval along the positive direction of the vertical scanning direction with respect to the position of the beam K (the position "00" shown with a thick line), the position of the beams is positioned concentratedly within the range equivalent to the scanning line interval (biased distribution).

If the check result in step 106 is YES, the sequence proceeds to step 108, then the value obtained by adding 1 to the quotient Qc, Qm, and Qy calculated in step 104 is set respectively as the number of delay lines Cc, Cm, and Cy of the beams C, M, and Y with respect to the beam K as described in the corresponding table in FIG. 6 (rounding up of remainder R).

$$Cc \leftarrow Qc+1,\ Cm \leftarrow Qm+1,\ Cy \leftarrow Qy+1$$

On the other hand, if the check result in step 106 is NO, then the sequence proceeds to step 110, whether the number of beams X having the remainder R value exceeding "½" is 1 or not is checked. If the check result in step 110 is NO, then the case corresponds to the second field from the top of the corresponding table in FIG. 6 (the field that "the number of beams having Rc, m, and y exceeding ½" is "1"). In the case of the number of beams N=4, the value which can be as the number of beams X having the remainder R exceeding "½" is any one of "0, 1, 2, and 3", X=1 indicates the relatively medium value.

Accordingly, if the check result in step 110 is YES, as obvious from the positional relation of each beam (the second arrangement and the third arrangement from the top of the layout diagram) corresponding the above-mentioned case shown in the layout diagram in FIG. 6, the degree of biased distribution of each beam in the range equivalent to the scanning line interval is relatively low, and the positional deviation magnitude is large (for example, the initial positional deviation magnitude of the third arrangement from the top of the layout diagram is approximately equal to the scanning line interval).

If the check result in step 110 is YES, then the sequence proceeds to step 112, and as shown in the corresponding table in FIG. 6, the value obtained by adding 1 to the quotient Qi calculated in step 104 is set (rounding up of the remainder R) as the number of delay lines Ci of the beam i with respect to the beam K i for the color i having the remainder R smaller than ¾, on the other hand, for the color i having the remainder R of ¾ or larger, the quotient Qj calculated in step 104 is set as it is (rounding down of the remainder R) as the number of delay lines Cj of the beam j with respect to the beam K.

$$Ci \leftarrow Qi+1\ \text{(wherein color } i \text{ of } R<¾)$$

$$Cj \leftarrow Qj+1\ \text{(wherein color } j \text{ of } R\geq¾)$$

The second arrangement from the top of the layout shown in FIG. 6 shows the case in which the value of the remainder R of one beam having the remainder R value exceeding "½" is ¾ or smaller and the remainder R of each beam is raised as a unit for all, on the other hand, the arrangement shown in the third shows the case in which the value of the remainder R of the above-mentioned beam is ¾ or larger (beam indicated with "○" on the right end) and the remainder R of this beam is omitted.

As the result, in the layout diagram shown in FIG. 6, as obvious from the layout of three marks shown with "●" in the second and third (represents the positional relation of each beam after the above-mentioned process in step 112), the positional deviation magnitude is suppressed within ¾ times a scanning line interval.

If the check result in step 110 is NO, then the sequence proceeds to step 114, and whether the number of beams X having the remainder R value exceeding "½" is 2 or not is checked. If the check result in step 114 is YES, then the case corresponds to the third field from the top of the corresponding table in FIG. 6 (the field that "the number having Rc, m, and y exceeding ½" is "2"). In the case of the number of beams N=4, the number of beams X=2 having the remainder R value exceeding "½" is a relatively medium value among values which X can be.

Therefore, if the check result in step 114 is YES, as obvious from the positional relation of each beam corresponding to the above-mentioned case shown in the layout diagram in FIG. 6 (the fourth and fifth arrangements from the top of the layout diagram), the degree of biased distribution of the position of each beam within the range corresponding to a scanning line interval is relatively low and the positional deviation magnitude is large (for example, the initial positional deviation magnitude of the fourth arrangement from the top of the layout diagram is approximately equal to a scanning line interval.).

Therefore, if the check result in the step 114 is YES, the sequence proceeds to step 116, as described in the corresponding table shown in FIG. 6, the value obtained by adding 1 to the quotient Qi calculated in step 104 is set as the number of delay lines Ci of the beam i with respect to the beam K for the color i having the remainder R smaller than ¼ (rounding up of the remainder R), on the other hand, for the color j having the remainder R of ¼ or larger, the quotient Qj calculated in step 104 is set as it is as the number of delay lines Cj of the beam j with respect to the beam K (rounding down of the remainder R).

$$Ci \leftarrow Qi+1\ \text{(wherein color } i \text{ of } R<¼)$$

$$Cj \leftarrow Qj+1\ \text{(wherein color } j \text{ of } R\geq¼)$$

The fourth arrangement from the top of the layout diagram shown in FIG. 6 represents the case in which the remainder R value of one beam having the remainder R value equal to or smaller than "½" is smaller than ¼ and the remainder R of the two beams (beams corresponding to two marks "○" shown on the right end) other than the beam described herein above is omitted, and the fifth arrangement represents the case in which the remainder R of all the beams is omitted because the remainder R value of the all beams is equal to or larger than ¼.

As the result, as obvious from the layout of three marks shown with "●" in the fourth and fifth arrangements from the top in the layout diagram shown in FIG. 6 (represents the positional relation of each beam subjected to the process in step 116 described herein above), the positional deviation magnitude is suppressed within ¾ times a scanning interval.

If the check result is step 114 is NO, the case corresponds to the case in which the number of beams X having the remainder R value exceeding "½" is 3, and corresponds to the fourth field from the top of the corresponding table shown in FIG. 6 (the field that the number having Rc, m, and y exceeding ½ is "3"). As obvious from the positional relation of each beam corresponding to the above-mentioned case shown in the layout diagram in FIG. 6 (the bottom arrangement shown in the layout diagram), the position of the beams is distributed biasedly within the range corresponding to a scanning line interval, and it is likely that the distance between the beam position of the beam K and the beam position of other beams becomes farther if the remainder R is raised.

Therefore, if the check result in step 114 is NO, the sequence proceeds to step 118, then the quotients Qc, Qm, and Qy calculated in step 104 as the number of delay lines Cc, Cm, and Cy of the beams C, M, Y with respect to the beam K are set as they are (the remainder R is omitted) as described in the corresponding table shown in FIG. 6.

$$Cc \leftarrow Qc, Cm \leftarrow Qm, Cy \leftarrow Qy$$

As described herein above, by performing rounding process by means of any one of steps 108, 112, 116, and 118 according to the selection condition for selecting a method of rounding process for each beam from among the rounding up of the remainder R and the rounding down of the remainder R which is set for each case categorized depending on the number of beams X having the remainder R value exceeding "½", the number of delay lines Cc, Cm, and Cy of respective beams C, M, and Y with respect to the beam K is set so that the maximum positional deviation magnitude of the image is suppressed within ¾ times a scanning line interval as obvious from the layout diagram shown in FIG. 6.

In the next step 120, the number of delay lines Cc, Cm, and Cy of the beams C, M, and Y with respect to the beam K is stored in the memory unit 40A as the timing control data served for correcting the color deviation in the vertical scanning direction, and the sequence is brought to an end. The number of delay lines stored as the timing control data is used when the image forming apparatus 10 forms and generates a color image, at that time a color image of the high image quality which is advantageous in that the color deviation magnitude along the vertical scanning direction is suppressed within ¾ times a scanning line interval is obtained.

Figure 7A:
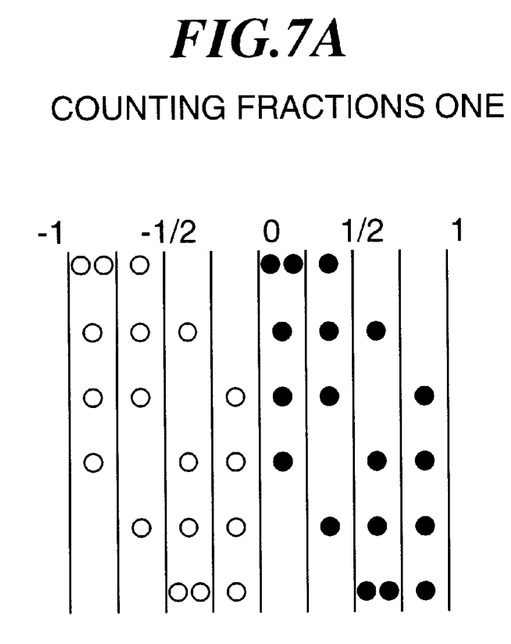
FIGS. 7A and 7B are layout drawings for showing an example of the positional relation of each beam for the cases of fraction rounding process, namely (7A) rounding up a fraction and (7B) counting fraction of 5 and over as a unit and disregarding the rest, as an comparative example of the present invention.
Figure 7B:
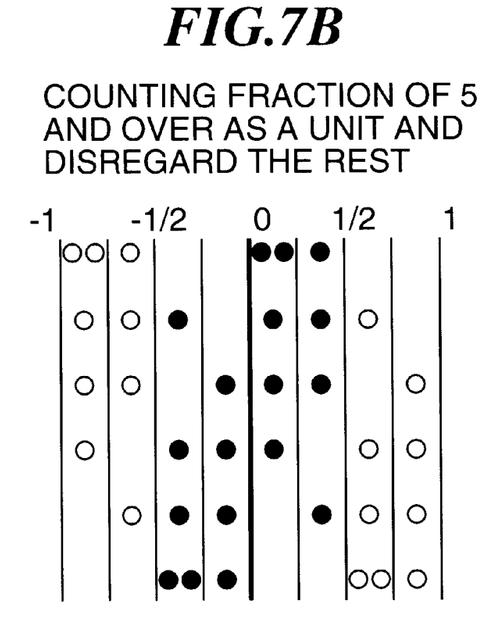

As comparative examples of rounding process, the beam position selected in the case of the rounding up for all is shown in FIG. 7A and the beam position selected in the case of the counting fraction of 5 and over as a unit and disregarding the rest is shown in FIG. 7B. As obvious from these FIGS. 7A and 7B, the maximum positional deviation magnitude of the image is larger than ¾ times a scanning line interval in the case of the rounding up and the case of the counting fraction of 5 and over as a unit and disregarding the rest, and it is obvious that the maximum positional deviation magnitude of the image according to fraction rounding process in accordance with the present invention is smaller than that according to fraction rounding process of the rounding up or the counting fraction of 5 and over as a unit and disregarding the rest.

Figure 8:
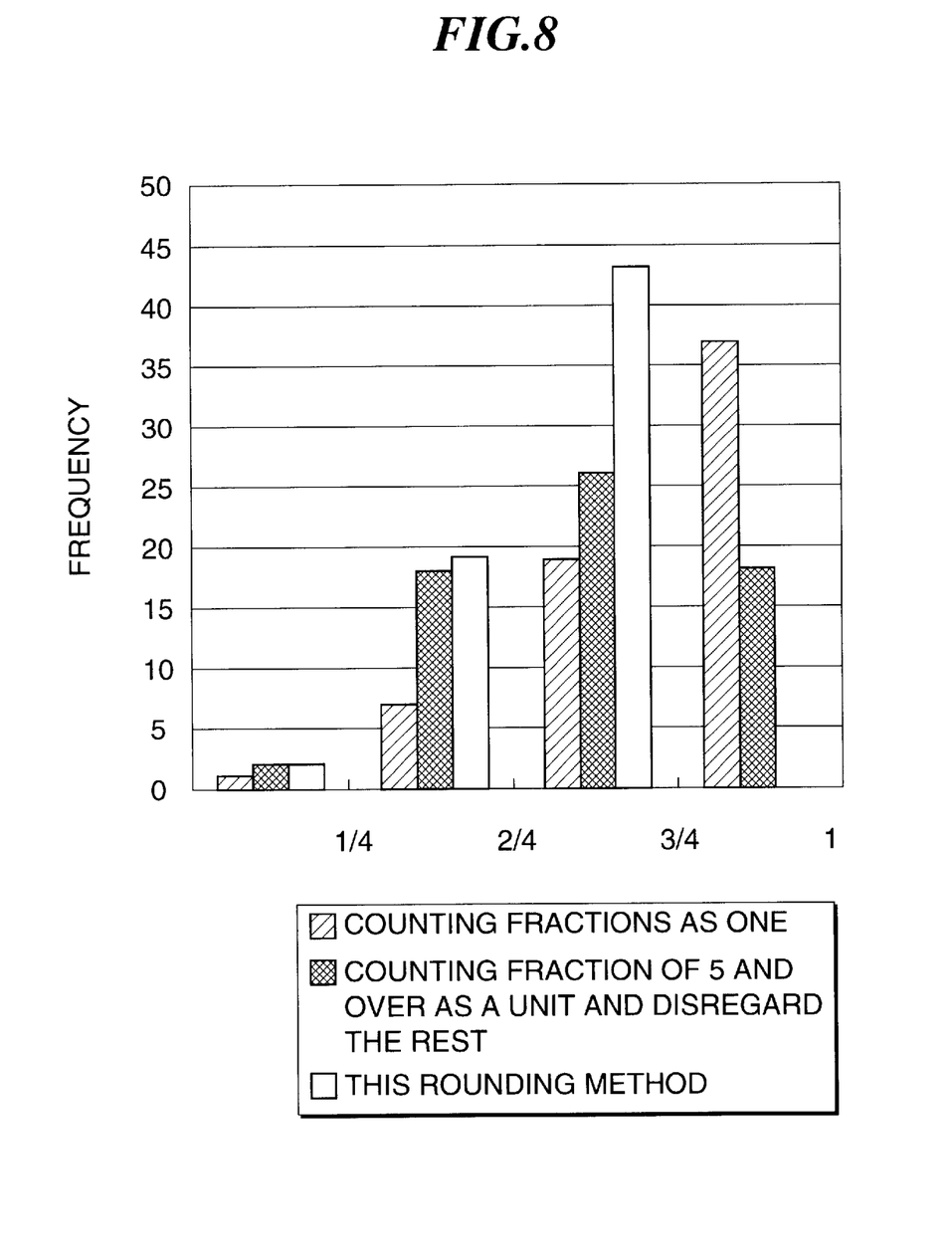
FIG. 8 is a graph for comparing the frequency of the maximum positional deviation magnitudes of the image for three fraction rounding processes, namely, rounding up a fraction, counting fraction of 5 and over as a unit and disregarding the rest, and the method in accordance with the present invention.

FIG. 8 shows the result of the frequency of the positional deviation magnitude ¼ times a scanning line interval or smaller, the frequency of the positional deviation magnitude 2/4 times a scanning line interval or smaller, the frequency of the positional deviation magnitude ¾ times a scanning line interval or smaller, and the frequency of the positional deviation magnitude ¾ times a scanning line interval or larger which are calculated by means of the rounding up a fraction (namely counting fractions as one), the counting fraction of 5 and over as a unit and disregarding the rest, and fraction rounding process in accordance with the present invention, wherein the frequency is calculated on the assumption that a scanning line interval is divided into ¼ four sections, four beams are located on any one of four sections, the combination of the beam position is represented by 64 different patterns, and each pattern happens at a certain probability.

As obvious in FIG. 8, the frequency of the positional deviation magnitude of the image ¾ times a scanning interval or higher is significantly higher for not only the rounding up of the fraction but also the counting fraction of 5 and over as a unit and disregarding the rest than for the fraction rounding process in accordance with the present invention, and it is understood that the positional deviation magnitude of the image can be suppressed at high probability by applying the fraction rounding process in accordance with the present invention.

The case in which the beam K is used as the reference is described hereinbefore, however a beam corresponding to another color other than K may be used as the reference.

Figure 9:
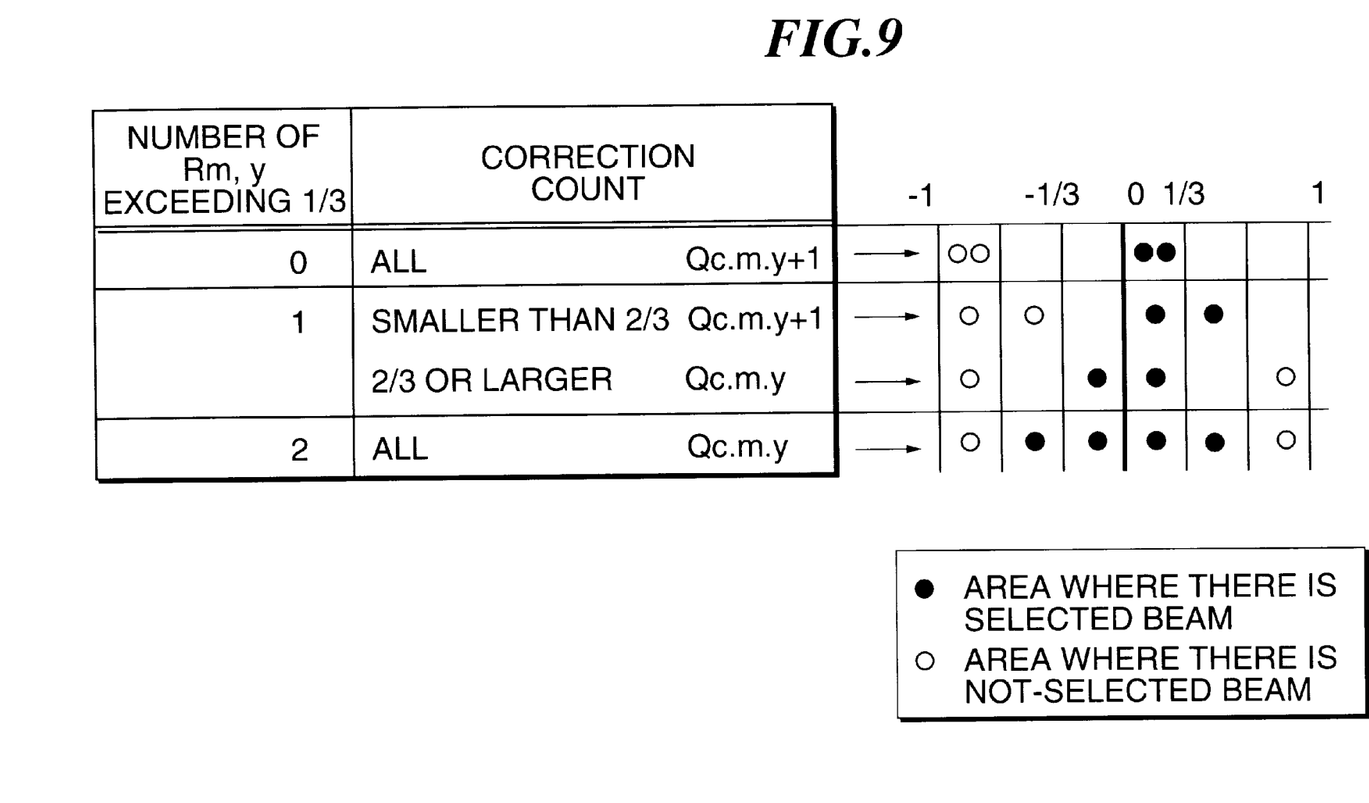
FIG. 9 is a corresponding table for showing categorization of the content of fraction rounding process for the case of the number of beams N=3 corresponding to the number of beams having the remainder R exceeding ⅓ and a layout diagram for showing an example of the positional relation of each beam for each categorization.

The case in which the number of beams N is 4 is described hereinbefore, however the present invention is by no means limited to the case of the number of beams N=4. As an example, the fraction rounding process for the case of the number of beams N=3 is shown in FIG. 9. FIG. 9 shows a corresponding table for showing the categorization depending on the number of beams having the remainder R exceeding ⅓ (=N−2/N), and shows a layout diagram for showing an example of the positional relation of each beam for each case. The case in which the number of delay lines of beams M and Y is calculated with reference to the beam C is exemplified herein under.

As obvious in FIG. 9 for N=3, if the number of beams X having the remainder R value exceeding "⅓" is 0, because the position of each beam is distributed biasedly in the range equivalent to a scanning line interval, the value obtained by adding 1 to the quotients Qm and Qy is set respectively as the number of delay lines Cm and Cy of the beams M and Y with respect to the beam C (rounding up of the remainder R).

In the case that the number of beams x having the remainder R value exceeding "⅓" is 1, the value that can be as the number of beams X having the remainder R value exceeding "⅓" at the number of beams N=3 is any one of "0, 1, and 2", and X=1 is the median value. Because the degree of biased distribution of the beam position is low in the case of X=1, the remainder R is raised as a unit for the color having the remainder R smaller than ⅔ and the remainder R is omitted for the color having the remainder R equal to or larger than ⅔ as described in the corresponding table in FIG. 9.

In the case that the number of beams X having the remainder R value exceeding "⅓" is 2, it is said not definitely that the position of each beam is distributed biasedly in the range equivalent to a scanning line interval, but it is likely that the distance between the beam position of the beam C and the beam positions of other beams becomes farther if the remainder R is raised as a unit, and the remainder R is therefore omitted without condition. As obvious from the positional relation of the beam position shown with the mark "●" in the layout diagram shown in FIG. 9, the maximum positional deviation magnitude of the image can be suppressed within ⅔ times a scanning line interval by applying the above-mentioned process.

The positional deviation magnitude of the image is detected by detecting the test pattern image formed on the intermediate transfer medium 14 by use of the writing position detection sensor 32 in the above-mentioned embodiment, however an alternative method in which the incident position of the laser beam on the photoreceptor is detected instead of the detection of the test pattern image and the writing delay time is determined based on the variation of the detected incident position may be used in the case that the variation of the incident position of the laser beam on the photoreceptor is considered to be the main cause of the positional deviation of the image.

The fraction rounding process (determination of the number of delay lines) in accordance with the present invention may be applied only on some light beams the number of which light beams is smaller than the total number of light beams involved in the image forming apparatus. Because the maximum positional deviation magnitude of the image along the vertical scanning direction is (N−1)/N times a scanning line interval in the present invention, the maximum positional deviation magnitude decreases as the N value decreases. Therefore, when a color image is generated, the fraction rounding process in accordance with present invention may be applied only to an image of a color which gives remarkable color deviation out of images of component colors of the color image, otherwise when a multi-color image is formed by use of some light beams the number of which light beams is smaller than the total number of light beams, the fraction rounding process in accordance with the present invention may be applied only to light beams used for forming the multi-color image.

As described hereinbefore, because the positional deviation magnitude along the direction intersecting to the scanning direction of the light beams of plural images to be overlapped is detected, the deviation of the modulation start timing of the light beams for correction of the detected positional deviation magnitude is calculated, the modulation start timing of the light beams is determined based on the combination of the deviation of the modulation start timing of the light beams using the time equivalent to one scanning with the light beam as the variation unit of the modulation start timing of the light beam, and the modulation of the light beams is controlled according to the determined modulation start timing, the positional deviation of the images along the direction intersecting to the scanning direction of the light beam is reduced without significantly complex structure and control when plural images are overlapped, thus the present invention exhibits the excellent effect as described herein above.

What is claimed is:

1. An image forming apparatus in which a photoreceptor is scanned with a plurality of light beams respectively to form a plurality of images thereon and the plurality of images are overlapped to generate a single image, the image forming apparatus comprising:

a detection part that detects, for each image, a positional deviation magnitude of that image in a direction orthogonal to a scanning direction with the light beams;

a correction part that calculates, for each light beam, a deviation of a modulation start timing of that light beam useable to correct the positional deviation magnitude for the respective image detected by the detection part, and determines for each light beam, the modulation start timing of that light beam based on a combination of the deviations of the modulation start timings of all of the light beams, using a time required for one scanning with the light beam as a unit for changing the modulation start timing of each light beam; and a modulation control part that controls, for each light beam, the modulation of that light beam according to the modulation start timing determined by the correction part for that light beam.

2. The image forming apparatus as claimed in claim 1, wherein the correction part obtains a quotient Q and a remainder R for each of the light beams other than a reference light beam by dividing the deviation of the modulation start timing of each of the light beams from the modulation start timing of the reference light beam by the time required for one scanning with the light beam, and determines the modulation start timing of each of the light beams based on a combination of values of the remainder R for respective light beams.

3. The image forming apparatus as claimed in claim 1, wherein the correction part obtains a quotient Q and a remainder R for each of N (N≦4) light beams by dividing the deviation of the modulation start timing of each of (N−1) light beams from the modulation start timing of a reference light beam by the time required for one scanning with the light beam, and based on conditions prescribed according to respective possible values of the number of the light beams having the remainder R exceeding (N−2)/N, selects rounding up or rounding down of the remainder R for each of the light beams to determine the modulation start timing of each of the light beams.

4. The image forming apparatus as claimed in claim 1, wherein the correction part applies the determination process of the modulation start timing of each light beam based on the combination of the deviation of the modulation start timing of the light beam only to some light beams the number of which is smaller than the total number of light beams.

5. The image forming apparatus as claimed in claim 1, wherein the detection part is capable of detecting the positional deviation magnitude of the image with a detection unit of 1/N scanning line interval, wherein N represents the number of light beams to which the correction part applies the modulation start timing determination process.

6. An image forming apparatus in which a photoreceptor is scanned with a plurality of light beams respectively to form a plurality of images thereon and the plurality of images are overlapped to generate a single image, the image forming apparatus comprising:

a detection part that detects, relative to a first image, for each other image, a positional deviation magnitude of that image in a direction orthogonal to a scanning direction with the light beams;

a correction part that calculates, for each light beam corresponding to one of the other images, a deviation of a modulation start timing of that light beam useable to correct the positional deviation magnitude for the respective other image detected by the detection part, and determines for each such light beam, the modulation start timing of that light beam based on a combination of the deviations of the modulation start timings of all of the such light beams, using a time required for one scanning with the light beam as a unit for changing the modulation start timing of each light beam; and a modulation control part that controls, for each such light beam, the modulation of that light beam according to the modulation start timing determined by the correction part for that light beam.

* * * * *